United States Patent
Aoki et al.

(10) Patent No.: US 7,719,725 B2
(45) Date of Patent: May 18, 2010

(54) PRINT CONTROL APPARATUS, PRINT APPARATUS, PRINT CONTROL METHOD, COMPUTER-READABLE MEDIUM AND COMPUTER-DATA SIGNAL

(75) Inventors: Yuka Aoki, Tokyo (JP); Takahiro Saito, Kawasaki (JP); Shintaro Kojo, Kawasaki (JP); Yukio Iijima, Kawasaki (JP); Hajime Ichida, Kawasaki (JP); Noriyuki Kajitani, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 69 days.

(21) Appl. No.: 12/204,880

(22) Filed: Sep. 5, 2008

(65) Prior Publication Data

US 2009/0190145 A1 Jul. 30, 2009

(30) Foreign Application Priority Data

Jan. 24, 2008 (JP) ............................. 2008-013507

(51) Int. Cl.
*H04N 1/40* (2006.01)
(52) U.S. Cl. ..................... 358/3.28; 358/1.15; 358/468
(58) Field of Classification Search ................. 358/1.9, 358/2.1, 3.28, 403, 1.14–1.15, 468, 1.18
See application file for complete search history.

(56) References Cited

U.S. PATENT DOCUMENTS

| | | | |
|---|---|---|---|
| 6,978,299 B1 * | 12/2005 | Lodwick | 709/223 |
| 7,184,571 B2 * | 2/2007 | Wang et al. | 382/100 |
| 7,268,899 B2 * | 9/2007 | Crumly | 358/1.14 |
| 7,466,442 B2 * | 12/2008 | Chapman | 358/1.18 |

FOREIGN PATENT DOCUMENTS

| | | |
|---|---|---|
| JP | 6-242893 A | 9/1994 |
| JP | 10-16358 A | 1/1998 |
| JP | 2001-197297 A | 7/2001 |

(Continued)

OTHER PUBLICATIONS

Takuya Kusunoki, Electronic Watermarkin Print Solution, Suppression of Information Leakage from Paper Document and Detection of Paper Document Falsification, Image Lab, Sep. 1, 2006, pp. 64-66, vol. 17, No. 9, Image Lab. Japan Industrial Publishing Co., Ltd., Japan.

(Continued)

*Primary Examiner*—Thomas D Lee
*Assistant Examiner*—Stephen M Brinich
(74) *Attorney, Agent, or Firm*—Sughrue Mion, PLLC

(57) ABSTRACT

A print control apparatus includes a print request receiving unit and a print control unit. The print request receiving unit receives a print request, including print target information, to a print apparatus. If a condition is satisfied under which print target information should have information regarding security added thereto for printing, the print control unit adds the information regarding security to the print target information and causes the print apparatus to print the print target information to which the information regarding security is added. If the condition is not satisfied, the print control apparatus stores the print target information included in the print request in a storage unit, and when an operation receiving unit provided in the print apparatus is operated to instruct to print the stored print target information, the print control apparatus causes the print apparatus to print the stored print target information.

6 Claims, 3 Drawing Sheets

FOREIGN PATENT DOCUMENTS

| | | |
|---|---|---|
| JP | 2001-346032 A | 12/2001 |
| JP | 2007-189355 A | 7/2007 |
| JP | 2007-267399 A | 10/2007 |

OTHER PUBLICATIONS

Seeking After Security of Paper, Plus Security Function without Changing Existing Print Environment, Nikkei Personal Computing, Nikkei Business Publication Inc., Jul. 12, 2007, No. 534, pp. 32-33.

Trend is Toward Countermeasures for Information Leakage & Internal Control, Multidirectional Commentaries are Given in Print Speed and Usability, No more Deviation! Business Printer Installation Guide 2007, Office Information Protection is Fully Prepared? Part 2, printer Security in the ear of Internal Control, Windows Mode, Feb. 24, 2007, pp. 89-91, vol. 12, No. 4.

Japanese Office Action dated Jul. 29, 2008.

\* cited by examiner

PRINT CONTROL APPARATUS, PRINT APPARATUS, PRINT CONTROL METHOD, COMPUTER-READABLE MEDIUM AND COMPUTER-DATA SIGNAL

CROSS-REFERENCE TO RELATED APPLICATIONS

This application is based on and claims priority under 35 USC 119 from Japanese Patent Application No. 2008-13507 filed Jan. 24, 2008.

BACKGROUND

1. Technical Field

The invention relates to a print control apparatus, a print apparatus, a print control method, a computer-readable medium and a computer-data signal.

2. Related Art

There is known a technology of adding image information regarding security such as a watermark (an electronic watermark) to an original document for printing for the purpose of preventing an unauthorized duplication of a confidential document or tracing a passage route of the confidential document.

By the way, from the viewpoint of security, it may be undesirable that a printed matter with no information regarding security added thereto is output by a print apparatus and left.

SUMMARY

According to an aspect of the invention, a print control apparatus includes a print request receiving unit and a print control unit. The print request receiving unit receives a print request to a print apparatus. The print request includes print target information. If a condition is satisfied under which print target information should have information regarding security added thereto for print, the print control unit adds the information regarding security to the print target information included in the print request and causes the print apparatus to print the print target information to which the information regarding security is added. If the condition is not satisfied, the print control apparatus stores the print target information included in the print request in a storage unit, and when an operation receiving unit provided in the print apparatus is operated to instruct to print the stored print target information, the print control apparatus causes the print apparatus to print the stored print target information.

BRIEF DESCRIPTION OF THE DRAWINGS

Exemplary embodiments of the invention will be described in detail based on the following figures, wherein.

DETAILED DESCRIPTION

Exemplary embodiments of the invention will be described below with reference to the accompanying drawings.

Figure 1:
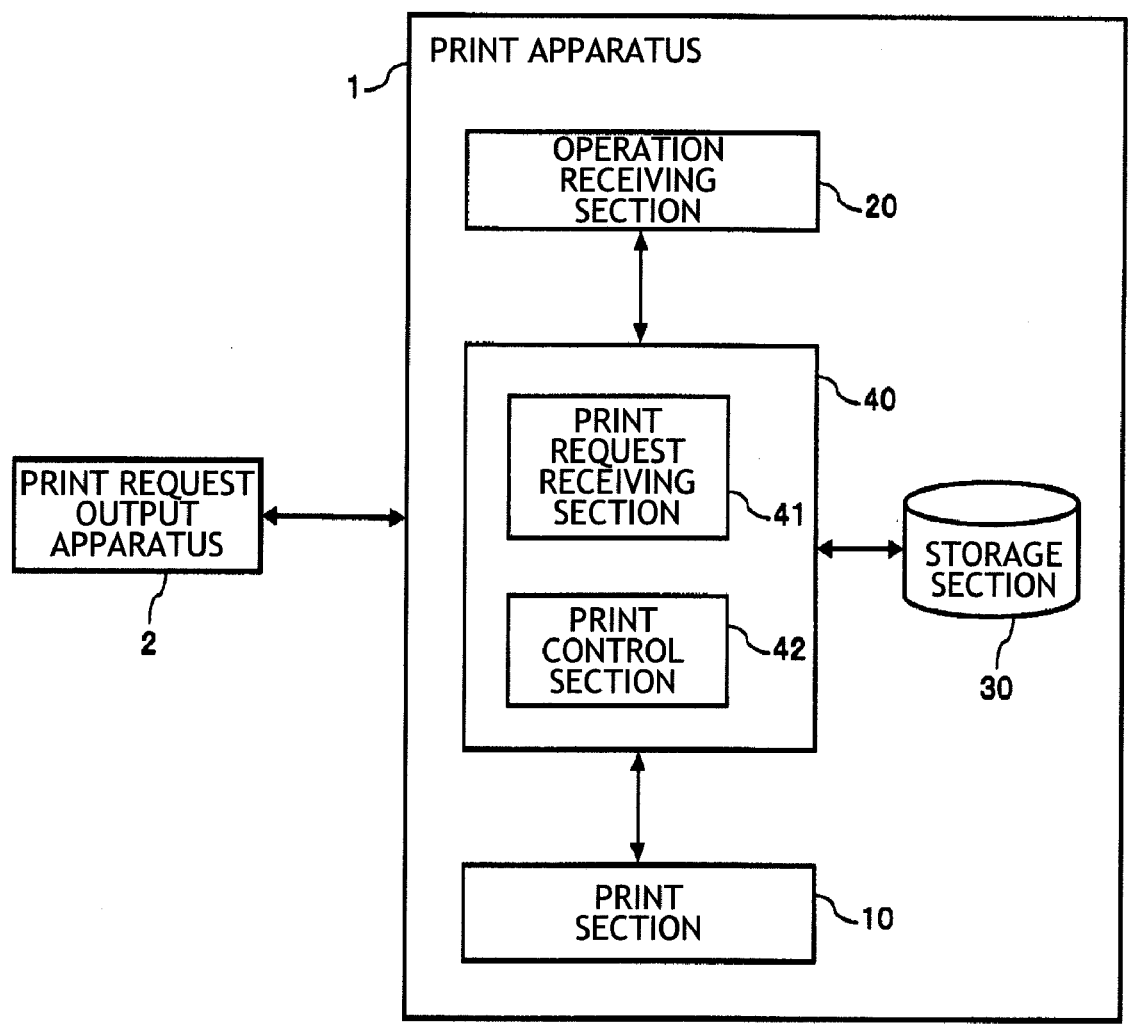
FIG. 1 is a block view showing one example of the configuration of a print apparatus according to an exemplary embodiment.

FIG. 1 is a block view showing one example of the configuration of a print apparatus 1 according to this exemplary embodiment. The print apparatus 1 is an apparatus for receiving a print request and printing based on the print request.

In FIG. 1, the print apparatus 1 has a print section 10, an operation receiving section 20, a storage section 30, and a control section 40.

The print section 10 prints on a print medium such as a sheet of paper. For example, the print section 10 is a print engine of an electrophotography system or an ink jet system.

The operation receiving section 20 receives a user's operation. In specific one exemplary embodiment, the operation receiving section 20 includes a display device for displaying various information, and an input device for receiving various user's operations. For example, the operation receiving section 20 is an operation panel such as a liquid crystal display of a touch panel system.

The storage section 30 stores print target information. For example, the storage section 30 is a storage device such as a hard disk.

The control section 40 receives a print request, and controls the print section 10 based on the print request. In one exemplary embodiment, the control section 40 is implemented by cooperation of hardware resources and software. For example, the control section 40 is a computer. Specifically, functions of the control section 40 are implemented in the following manner. That is, a print control program recorded on a recording medium is read into a main memory, and executed by a CPU (Central Processing Unit). The print control program may be provided with recorded on a computer-readable recording medium such as a CD-ROM. Alternatively, the print control program may also be provided through communication as data signals. Also, the control section 40 may be implemented only by hardware.

The control section 40 includes a print request receiving section 41 and a print control section 42.

The print request receiving section 41 receives a print request, including print target information, to the print apparatus 1. For example, the print request receiving section 41 receives a print request from a print request output apparatus 2 that is used by a requester of the print request. The print request output apparatus 2 is, for example, a computer, and is connected to the print apparatus 1 via a network such as a LAN (Local Area Network).

If a condition under which print target information should have information regarding security added thereto for printing is satisfied, the print control section 42 adds the information regarding security to the print target information included in the print request received by the print request receiving section 41, and causes the print section 10 to print the resultant print target information. On the other hand, if the condition is not satisfied, the print control section 42 stores the print target information included in the print request into the storage section 30. Then, when the operation receiving section 20 is operated to instruct to print the stored print target information, the print control section 42 causes the print section 10 to print the stored print target information.

The information regarding security (which may be hereinafter referred to as "security information") is, for example, information for ensuring security of printed information, information for inhibiting unauthorized duplication or unauthorized use of printed information, information for tracing a source or a leakage route of printed information, or information for protecting the copyright of printed information. Specifically, the security information may include information for specifying an author of printed information (e.g., a name of a document author), information for specifying a person who has printed (e.g., a name of a print requester), a name of printed information (e.g., a document name), date and time of printing, information for specifying the print request output apparatus 2 which has transmitted the print request (e.g., IP address), information for specifying the print apparatus 1 (e.g., IP address), characters such as "copy prohibited", a company mark, and/or information (e.g., serial number) for specifying a printed matter.

The security information may be information included in the print request (e.g., the IP address of the print request output apparatus 2, the name of the print requester, and/or the name of document), or information previously registered in the print apparatus 1 (e.g., the IP address of the print apparatus 1, predetermined letters and marks). Alternatively, the security information may be information generated by the print apparatus 1 (e.g., printing date and time and/or serial number).

In one exemplary embodiment, the security information is added to the print target information as a watermark (an electronic watermark). However, in another exemplary embodiment, the security information may be added to the print target information in a form other than the electronic watermark. For example, the security information may be added as a machine readable code such as a bar code, or as a header or a footer. Alternatively, the security information may be added as a combination of a watermark and a machine readable code. For example, by using the technology described in JP 2001-346032 A, the security information may be added as copy forgery preventing image data including a machine readable code provided in any one of a latent image part and a background part. In the exemplary embodiment in which the security information is added as a machine readable code, the machine readable code may be information for control of an apparatus of a copier or the like, such as prohibition of the copying operation of a copier.

From the viewpoint of favorably preventing unauthorized copying, in one exemplary embodiment, the security information is embedded in the entire surface of a print medium. For example, the security information is embedded as a watermark in the entire surface of a print medium. However, the security information may be placed in a partial region of the print medium.

From the viewpoint of preventing a user, who is not authorized to produce an output without adding security information, outputting print target information without adding security information, in one exemplary embodiment, the condition is that the requester of the print request is a person other than a specific user. In this exemplary embodiment, if the requester of the print request is not the specific user, the print control section 42 adds the security information to the print target information for printing. If the requester is the specific user, the print control section 42 stores the print target information, and causes the print target information to be printed when a print instruction is made. In this case, the print control section 42 receives, for example, user identification information for identifying the requester from the requester or the print request output apparatus 2. Then, the print control section 42 judges as to whether or not the user identification information has been previously registered in a storage section. If the user identification information has been registered, the print control section 42 judges that the requester is the specific user. When the requester is not registered, the print control section 42 judges that the requester is not the specific user. The specific user is, for example, a user who is authorized to produce an output without adding the security information thereto. The specific user is set by, for example, the administrator of the print apparatus 1.

However, the condition may be a condition other than the above one. For example, the condition may be a condition that the print request includes an instruction to the effect that the print target information should have the information regarding security added thereto for printing. In this case, from the viewpoint of preventing a user, who is not authorized to produce an output without adding security information, from producing an output without adding security information, in one exemplary embodiment, if the condition is not satisfied (namely, if the print request does not include such an instruction), the print control section 42 stores the print target information included in the print request into the storage section 30. Then, when the operation receiving section 20 is operated to instruct to print the stored print target information by the specific user, the print control section 42 causes the print section 10 to print the stored print target information. In this case, the print control section 42 receives, for example, user identification information for identifying the user from an operator of the operation receiving section 20 via the operation receiving section 20 or the like. Then, the print control section 42 judges as to whether or not the user identification information has been previously registered in the storage section. If the user identification information has been registered, the print control section 42 judges that the operator is the specific user. If the operator is not registered, the print control section 42 judges that the operator is not the specific user. The specific user is, for example, a user who is authorized to produce an output without adding security information thereto. The specific user is set by, for example, the administrator of the print apparatus 1. Incidentally, if the operator is not the specific user, the print control section 42, for example, does not print the print target information, or forcibly adds security information to the print target information for printing.

In one exemplary embodiment, the print control section 42 has, as its operation modes, (i) a forcible addition mode for forcibly adding security information to all print target information and (ii) a forcible addition cancel mode for not forcibly adding security information. When the system is set in the forcible addition mode and when the print control section 42 receives a print request including print target information, the print control section 42 adds security information to the print target information, and causes the print section 10 to print the resultant print target information. On the other hand, when the system is set in the forcible addition cancel mode, namely, when the forcible addition setting is released, the print control section 42 performs the above described control from the viewpoint of preventing a printed matter with no security information added thereto from being printed by the print apparatus 1 and from being left. Namely, if the condition is satisfied, the print control section 42 adds security information to the print target information for printing. Otherwise, the print control section 42 stores the print target information. Then, when an operation of instructing printing is performed, the print control section 42 causes the print target information to be printed. The forcible addition mode and the forcible addition cancel mode are switched by, for example, the administrator of the print apparatus 1. In one use example, the print apparatus 1 is generally set in the forcible addition mode. When there arises necessity of performing printing without adding security information, the mode is switched to the forcible addition cancel mode. The switching is performed by, for example, the administrator or a user authorized by the administrator via the operation receiving section 20 of the print apparatus 1 or an information processing apparatus connected to the print apparatus 1.

In the example of FIG. 1, the storage section 30 is provided in the print apparatus 1. However, the storage section 30 may also be provided outside the print apparatus 1.

Also, in the example of FIG. 1, the control section 40 is provided in the print apparatus 1. However, the control section 40 may be provided outside the print apparatus 1. For example, the control section 40 may be implemented by a print server connected to the print apparatus 1. Also, the control section 40 may be implemented physically by one device or may be implemented physically by plural devices.

Figure 2:
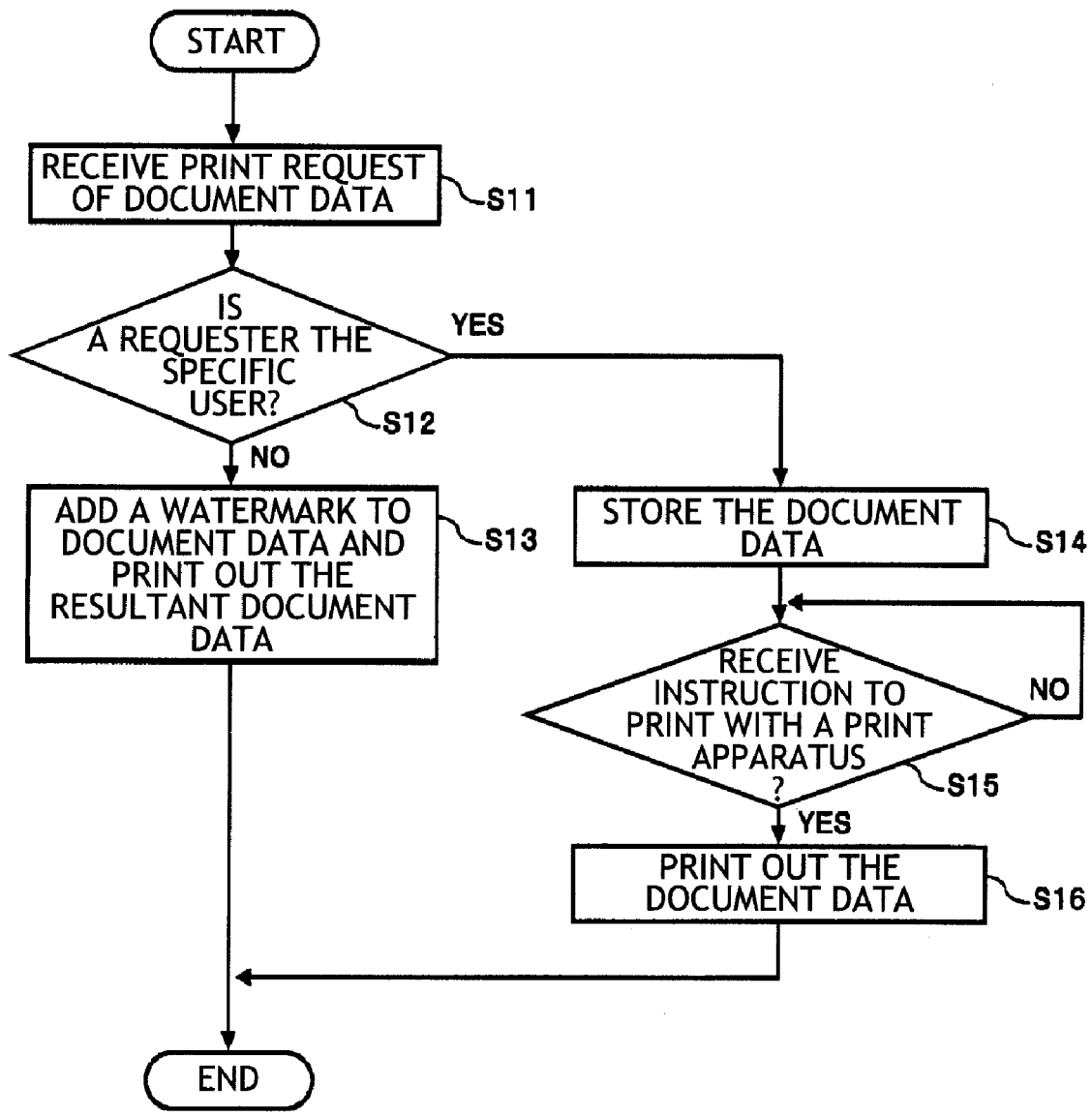
FIG. 2 is a flowchart showing a first example of an operation of the print apparatus according to the exemplary embodiment.

FIG. 2 is a flowchart showing a first example of the operation of the print apparatus 1 according to this exemplary embodiment. With reference to FIG. 2, the first example of the operation of the print apparatus 1 will be described below.

The control section 40 receives a print request from a requester including document data which is an example of the print target information (S11). Specifically, the control section 40 receives the print request from the print request output apparatus 2.

Then, the control section 40 judges as to whether or not the requester of the print request is the specific user (S12). For example, the control section 40 receives authentication information for authenticating the requester from the print request output apparatus 2. Then, the control section 40 authenticates the requestor using the authentication information, and judges as to whether or not the authenticated user is a specific user set in advance. The control section 40 may extract authentication information from the print request. Alternatively, the control section 40 may receive authentication information by inquiring of the requester after receiving the print request.

When the control section 40 judges that the requester is not the specific user (S12: NO), the control section 40 adds a watermark, which is an example of the security information, to the document data included in the print request to generate document data with a watermark added thereto, and causes the print section 10 to print the document data with the watermark added thereto (S13).

On the other hand, if the control section 40 judges that the requester is the specific user (S12: YES), the control section 40 stores the document data included in the print request into the storage section 30 (S14).

Then, the control section 40 waits until it receives a instruction of printing the stored document data from a user via the operation receiving section 20 (S15: NO). Upon receiving the print instruction (S15: YES), the control section 40 causes the print section 10 to print the document data stored in the storage section 30 (S16). In this case, the control section 40 does not forcibly add a watermark to the document data. For example, when an instruction to the effect that a watermark should be added is not included in the print request, the control section 40 causes the document data to be printed with no watermark added thereto. When an instruction to the effect that a watermark should be added is included in the print request, the control section 40 causes the document data to be printed with a watermark added thereto.

As described above, when the requester is a person other than the specific user, after receiving of the print request, a watermark is forcibly added to the document data. Immediately thereafter, the document data is printed out.

On the other hand, when the requester is the specific user, after receiving of the print request, the document data is stored. Then, the user performs a print instruction operation for the operation receiving section 20, so that the document data is printed out. For example, after the document data is stored, the requester comes in front of the print apparatus 1, and performs the print instruction operation. Then, the document data is printed.

Figure 3:
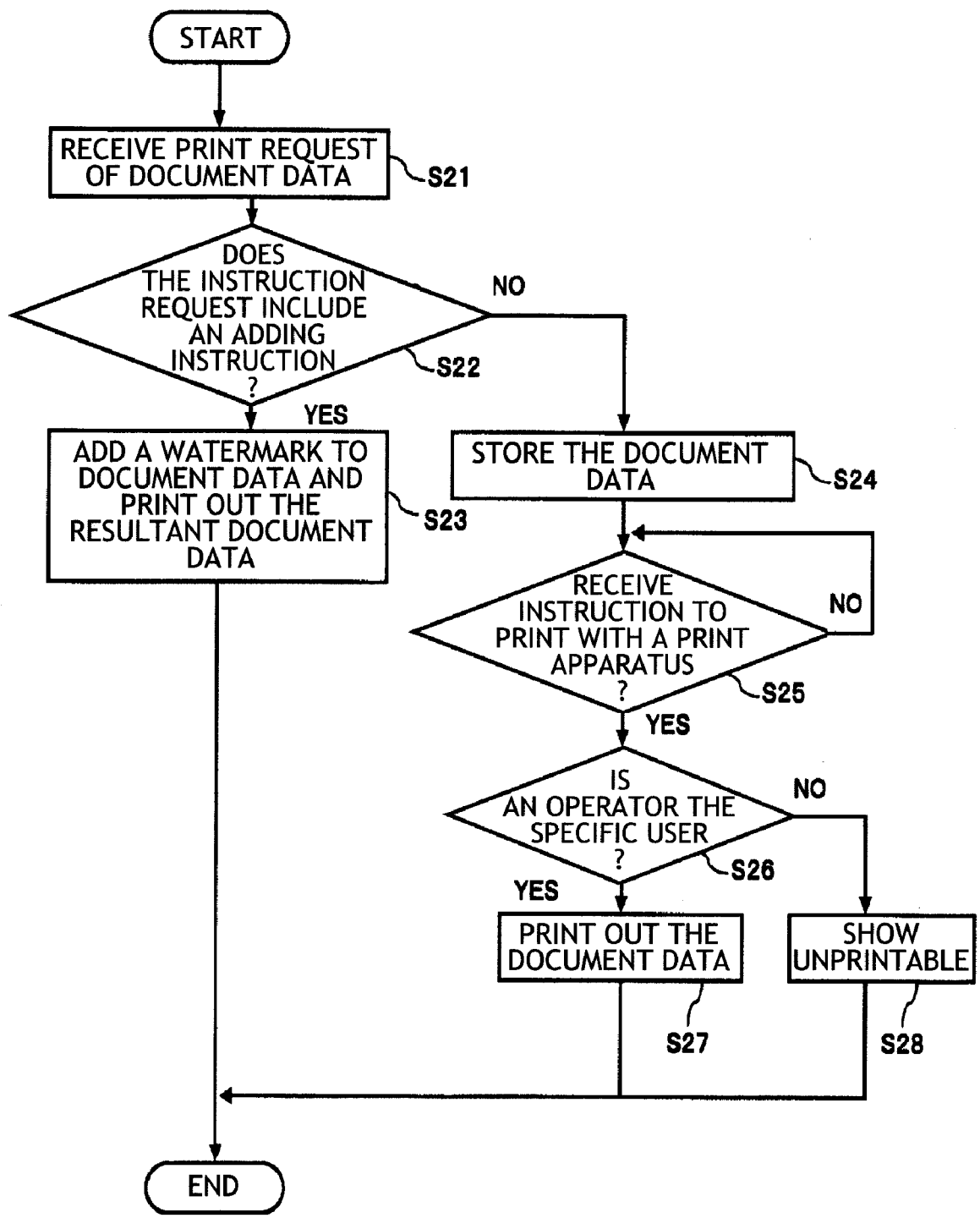
FIG. 3 is a flowchart showing a second example of an operation of the print apparatus according to the exemplary embodiment.

FIG. 3 is a flowchart showing a second example of the operation of the print apparatus 1 according to this exemplary embodiment. With reference to FIG. 3, the second example of the operation of the print apparatus 1 will be described below.

The control section 40 receives a print request, from a requester, including document data which is an example of print target information (S21). Specifically, the control section 40 receives the print request from the print request output apparatus 2.

Then, the control section 40 judges as to whether or not the print request includes an instruction to the effect that a watermark should be added (S22).

When the control section 40 judges that the print request includes the instruction to the effect that a watermark should be added (S22: YES), the control section 40 adds a watermark, which is an example of the security information, to the document data included in the print request to generate document data with a watermark added thereto, and causes the print section 10 to print out the document data with the watermark added thereto (S23).

On the other hand, when the control section 40 judges that the print request does not include an instruction to the effect that a watermark should be added (S22: NO), the control section 40 stores the document data included in the print request into the storage section 30 (S24).

Then, the control section 40 waits until it receives an instruction of printing the stored document data from a user via the operation receiving section 20 (S25: NO). Upon receiving the print instruction (S25: YES), the control section 40 judges as to whether or not the operator of the print instruction is the specific user (S26). For example, the control section 40 receives authentication information from the operator via the operation receiving section 20 or the like. Then, the control section 40 authenticates the operator using the authentication information, and judges as to whether or not the authenticated user is the previously set specific user.

When the control section 40 judges that the operator is the specific user (S26: YES), the control section 40 causes the print section 10 to print the document data stored in the storage section 30 (S27). In this case, the document data is output with no watermark added thereto.

On the other hand, when the control section judges that the operator is not the specific user (S26: NO), the control section 40 does not print the stored document data, but shows to the operator information indicating that the document data is unprintable (S28). In this case, the control section 40 may cause the print section 10 to print the document data with a watermark added thereto, in place of showing to the operator the information indicating that the document data is unprintable As described above, when the print request includes an instruction to the effect that a watermark should be added, after receiving of the print request, a watermark is added to the document data. Immediately thereafter, the document data is printed out.

On the other hand, when the print request does not include an instruction to the effect that a watermark should be added, after receiving of the print request, the document data is stored. Then, the specific user performs a print instruction operation for the operation receiving section 20, so that the document data is printed out. For example, after the document data is stored, the requester comes in front of the print apparatus 1, and performs the print instruction operation. Then, after the requester is confirmed to be a specific user, the document data is printed.

In the example of FIG. 3, upon receiving the print instruction, the control section 40 judges as to whether or not the operator is the specific user. However, upon receiving the print instruction, the control section 40 may cause the print section 10 to print the document data stored in the storage section 30. Namely, in FIG. 3, an arrow of YES of the step S25 may be connected to the step S27. In this case, the steps S26 and S28 are omitted.

It should be noted that the invention is not limited to the exemplary embodiments, and various modifications may be made within the scope not departing from the gist of the invention.

What is claimed is:

1. A print control apparatus comprising:
   a print request receiver that receives a print request to a print apparatus from a print request output unit, the print request including print target information; and
   a print controller, wherein
   the print controller receives authentication information for authenticating a requester of the print request from the print request output unit, authenticates the requester by utilizing the authentication information and judges whether or not the authenticated requester is a previously set specific user who is allowed to output without adding security information for inhibiting unauthorized duplication of printed information;
   if it is judged that the authenticated requester is not the specific user, the print controller causes the print apparatus to print with the security information forcibly added to the print target information included in the print request; and
   if it is judged that the authenticated requester is the specific user, the print controller causes a storage device to store the print target information included in the print request without forcibly adding the security information, and when an operation receiver provided in the print apparatus is operated to instruct to print the stored print target information, the print controller causes the print apparatus to print the stored print target information.

2. A print control apparatus comprising:
   a print request receiver that receives a print request to a print apparatus from a print request output unit, the print request including print target information; and
   a print controller, wherein
   the print controller judges whether or not the print request includes an instruction to print with security information for inhibiting unauthorized duplication of printed information added to the print target information;
   if it is judged that the instruction is included, the print controller causes the print apparatus to print with the security information added to the print target information included in the print request; and
   if it is judged that the instruction is not included, the print controller causes a storage device to store the print target information included in the print request without adding the security information and waits until a print instruction to print the stored print target information is received via an operation receiver provided in the print apparatus, and when the print instruction is received, receives authentication information from an operator of the print instruction, authenticates the operator by utilizing the authentication information, and judges whether or not the authenticated operator is a previously set specific user who is allowed to output without adding the security information, and when it is judged that the authenticated operator is the specific user, causes the print apparatus to print the stored print target information.

3. A print apparatus comprising:
   a printer that prints on a print medium;
   an operation receiver that receives an operation from a user;
   a print request receiver that receives a print request from a print request output unit, the print request including print target information;
   a print controller, wherein
   the print controller receives authenticating information for authenticating a requester of a print request from the print request output unit, authenticates the requester by utilizing the authentication information and judges whether or not the authenticated requester is a previously set specific user who is allowed to output without security information for inhibiting unauthorized duplication of printed information;
   if it is judged that the authenticated requester is not the specific user, the print controller causes the printer to print with the security information forcibly added to the print target information included in the print request; and
   if it is judged that the authenticated requester is the specific user, without forcibly adding the security information, the print controller causes a storage device to store the print target information included in the print request, and when the operation receiver is operated to instruct to print the stored print target information, the print controller causes the print apparatus to print the stored print target information.

4. A print apparatus comprising:
   a printer that prints on a print medium;
   an operation receiver that receives a user's operation;
   a print request receiver that receives a print request from a print request output unit, the print request including print target information; and
   a print controller, wherein
   it is judged whether or not the print request includes an instruction to print with security information for inhibiting unauthorized duplication of printed information added to the print target information;
   if it is judged that the instruction is included, the print controller causes the printer to print with the security information added to the print target information included in the print request; and
   if it is judged that the instruction is not included, the print controller causes a storage device to store the print target information included in the print request without adding the security information and waits until a print instruction of the stored print target information is received via the operation receiver, and when the print instruction is received, receives authenticating information from an operator of the print instruction, authenticates the operator by utilizing the authentication information, and judges whether or not the authenticated operator is a previously set specific user who is allowed to output without adding the security information, and when it is judged that the operator is the specific user, the print controller causes the print apparatus to print the stored print target information.

5. A computer-readable medium that stores a program causing a computer to execute a print control process, the print control process comprising:
   receiving a print request to a print apparatus from a print request output unit, the print request including print target information;

receiving authentication information for authenticating a requester of the print request from the print request output unit, authenticating the requester by utilizing the authentication information, and judging whether or not the authenticated requester is a previously set specific user who is allowed to output without adding security information for inhibiting unauthorized duplication of printed information;

if it is judged that the authenticated requester is not the specific user, causing the print apparatus to print with the security information forcibly added to the print target information included in the print request; and if it is judged that the authenticated requester is the specific user, without forcibly adding the security information, causing a storage device to store the print target information included in the print request, and when an operation receiver provided in the print apparatus is operated to instruct to print the stored print target information, causing the print apparatus to print the stored print target information.

6. A computer-readable medium that stores a program causing a computer to execute a print control process, the print control process comprising:

receiving a print request to a print apparatus from a print request output apparatus, the print request including print target information;

judging whether or not the print request includes an instruction to print with security information for inhibiting unauthorized duplication of printed information added to the print target information;

if it is judged that the print request includes the instruction, causing the print apparatus to print with the security information added to the print target information included in the print request;

if it is judged that the print request does not include the instruction, without adding the security information, causing a storage device to store the print target information included in the print request, waiting until a print instruction of the stored print target information is received via an operation receiver provided in the print apparatus, and when the print instruction is received, receiving authentication information from an operator of the print instruction, authenticating the operator by utilizing the authentication information, judging whether or not the authenticated operator is a previously set specific user who is allowed to output without adding the security information, and when it is judged that the authenticated operator is the specific user, causing the print apparatus to print the stored print target information.

* * * * *